(12) United States Patent
Foote (10) Patent No.: US 10,554,031 B1
(45) Date of Patent: Feb. 4, 2020

(54) PIGTAIL ELECTRICAL BOX

(71) Applicant: Galvin C. Foote, Greemwppd, AR (US)

(72) Inventor: Galvin C. Foote, Greemwppd, AR (US)

( * ) Notice: Subject to any disclaimer, the term of this patent is extended or adjusted under 35 U.S.C. 154(b) by 0 days.

(21) Appl. No.: 16/274,694

(22) Filed: Feb. 13, 2019

(51) Int. Cl.
*H02G 3/16* (2006.01)
*H02G 3/18* (2006.01)
*H02G 3/08* (2006.01)

(52) U.S. Cl.
CPC .............. *H02G 3/16* (2013.01); *H02G 3/083* (2013.01); *H02G 3/18* (2013.01)

(58) Field of Classification Search
CPC ............. H02G 3/16; H02G 3/18; H02G 3/083
USPC ........................................................ 174/535
See application file for complete search history.

(56) References Cited

U.S. PATENT DOCUMENTS

| | | | |
|---|---|---|---|
| 3,676,571 A | 7/1972 | Rubinstein ....................... | 174/65 |
| 4,082,915 A | 4/1978 | Silver ............................... | 174/51 |
| 4,361,302 A | 11/1982 | Lass ................................. | 248/56 |
| 4,591,658 A * | 5/1986 | Bauer ..................... | H02G 3/065 |
| | | | 174/661 |
| 4,842,551 A * | 6/1989 | Heimann ............... | H01R 27/00 |
| | | | 174/58 |
| 5,596,174 A | 1/1997 | Sapienza ......................... | 174/57 |
| 5,785,551 A | 7/1998 | Libby ............................ | 439/535 |
| 5,831,213 A * | 11/1998 | Wright ..................... | H02G 3/18 |
| | | | 174/64 |
| 5,975,938 A | 11/1999 | Libby ............................ | 439/410 |
| 6,361,333 B1 | 3/2002 | Cash, Jr. ....................... | 439/106 |
| 6,756,541 B1 | 6/2004 | Mollick et al. .................. | 174/58 |
| 6,800,806 B1 * | 10/2004 | Grday .................... | H02G 3/126 |
| | | | 174/50 |
| 7,294,017 B2 | 11/2007 | Scott ............................ | 439/535 |
| 8,235,748 B2 * | 8/2012 | Lacey ...................... | H02G 3/18 |
| | | | 439/502 |
| 2006/0105626 A1 * | 5/2006 | Scott .................... | H01R 9/2491 |
| | | | 439/535 |
| 2006/0216988 A1 * | 9/2006 | Scott .................... | H01R 9/2433 |
| | | | 439/535 |
| 2017/0125991 A1 * | 5/2017 | Korcz .................. | H02G 3/0691 |
| 2017/0163014 A1 * | 6/2017 | Korcz .................. | H02G 15/007 |

* cited by examiner

*Primary Examiner* — Sherman Ng
(74) *Attorney, Agent, or Firm* — Keisling & Pieper PLC; David B. Pieper (57) ABSTRACT

A pigtail electrical box with interior routing guides and terminals for maintaining minimum wire lengths and providing an isolated pigtail connection.

11 Claims, 8 Drawing Sheets

FIG. 15

PIGTAIL ELECTRICAL BOX

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in electrical plug mounting boxes for residential and commercial environments. More particularly, the invention relates to improvements particularly suited for simplified testing, easier device installation, and reduced wire flex while providing consumer level interchangeability of electrical devices. In particular, the present invention relates specifically to a fixed position input wire box with a detachable pigtail interconnect having a plug connector for device installation.

2. Description of the Known Art

As will be appreciated by those skilled in the art, electrical boxes are known in various forms. Patents disclosing information relevant to electrical boxes include: U.S. Pat. No. 7,294,017, issued to Scott on Nov. 13, 2007 entitled Electrical receptacle and junction box free of wire-nuts; U.S. Pat. No. 6,756,541, issued to Mollick, et al. on Jun. 29, 2004 entitled Electrical outlet box with mounting means; U.S. Pat. No. 6,361,333, issued to Cash, Jr. on Mar. 26, 2002 entitled Electrical junction box; U.S. Pat. No. 5,975,938, issued to Libby on Nov. 2, 1999 entitled Quick connect electrical connector for multi conductor insulated cable wiring; and U.S. Pat. No. 5,785,551, issued to Libby on Jul. 28, 1998 entitled Quick connect electrical box; U.S. Pat. No. 5,596,174, issued to Sapienza on Jan. 21, 1997 entitled Expandable electrical outlet box; U.S. Pat. No. 4,361,302, issued to Lass on Nov. 30, 1982 entitled Cable clamp for electrical outlet box; U.S. Pat. No. 4,082,915, issued to Silver on Apr. 4, 1978 entitled Electrical junction box; and U.S. Pat. No. 3,676,571, issued to Rubinstein on Jul. 11, 1972 entitled Electrical outlet box. Each of these patents is hereby expressly incorporated by reference in their entirety.

From these prior references it may be seen that these prior art patents are very limited in their teaching and utilization, and an improved pigtail electrical box is needed to overcome these limitations.

SUMMARY OF THE INVENTION

The present invention is directed to an improved pigtail electrical box for connecting an electrical cable. The pigtail electrical box defines a box interior with an open center by using a box body with a side wall and back wall. The cable enters through cable aperture and is secured by a cable clamp. The individual electrical wires of the cable are then routed using multiple purpose routing guides formed with a guide body including an electrical wire coupler. To meet the code requirements for the length of wires that have to be available in the box, wires are routed around the outside of one of the routing guides and across the open center to another routing guide where the wire is connected to the electrical wire coupler. A pigtail harness is then connected to the electrical wire coupler. The pigtail harness includes a female pigtail coupler body so that the electrical connections are protected. A male coupler body is then connected to the female coupler to connect an electrical device such as a plug or switch. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

As shown in FIG. 1-15 of the drawings, one exemplary embodiment of the present invention is generally shown as a pigtail electrical box 100 for use an electric cable 10. The electrical cable 10 show includes an outer sheath 12 covering a first wire 14, second wire 16, and third wire 18 entering the box along a cable axis 20. Each wire is insulated and can be stripped to expose the conductive core as is well known in the art.

Figure 13:
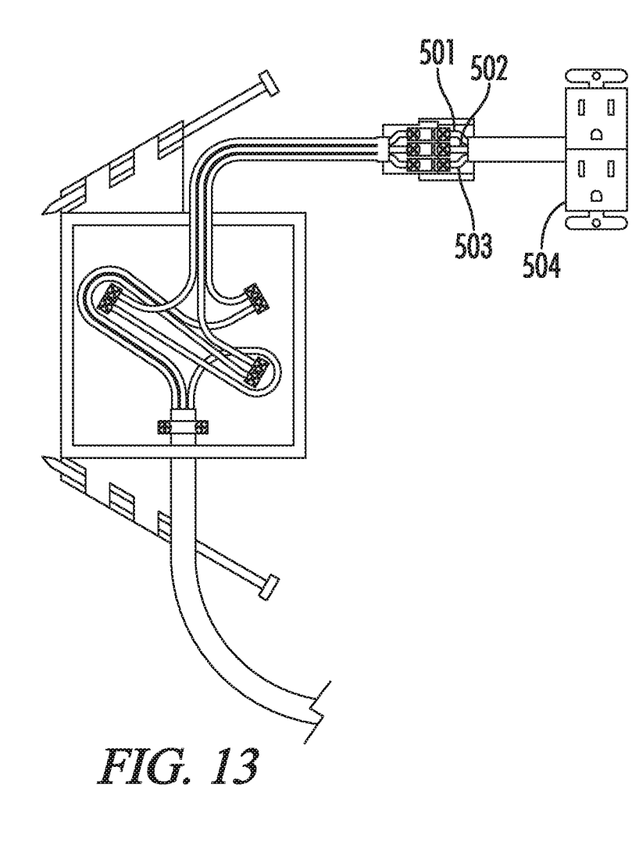
FIG. 13 is a front view of a rectangular pigtail electrical box with the male pigtail coupler body connected to the female coupler.
Figure 14:
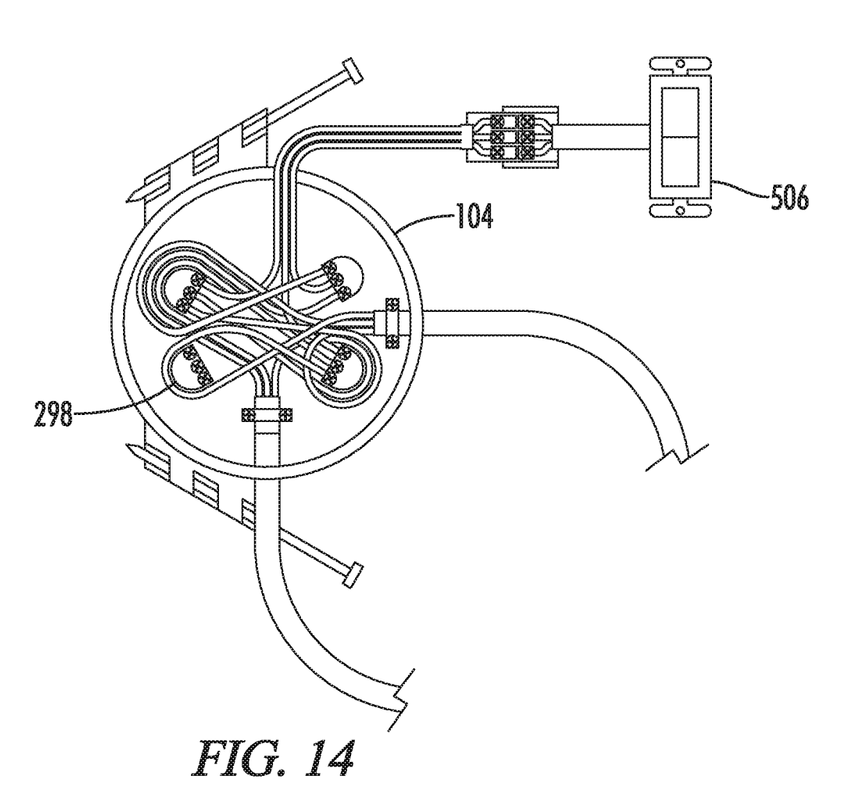
FIG. 14 is a front view of a round pigtail electrical box with three aperture electrical wire clamps including a curved side and showing another electrical cable installed through the wall.
Figure 15:
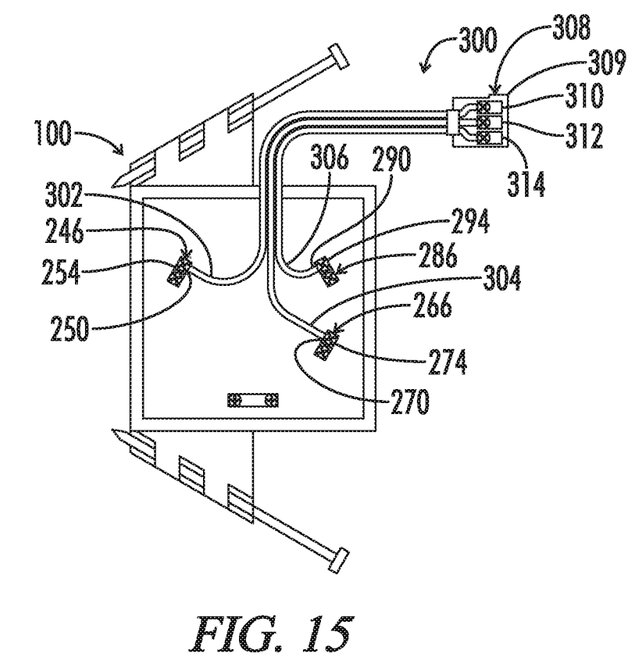
FIG. 15 is a front view of a rectangular pigtail electrical box with an installed pigtail harness.

The pigtail electrical box 100 is shown as a square version of a rectangular box 102 in FIGS. 1-13 with FIG. 14 showing a round box 104 with both types defining a box interior 106 with an open center 108. The box interior 106 is defined by the box body 200 that includes a side wall 201. The side wall 201 is curved on the round version 104 with the side wall 201 on the rectangular box 102 version including a box bottom 202, box top 204, box left side 206, and box right side 208. Both the rectangular box 102 and round box 104 include a back wall 210.

Figure 1:
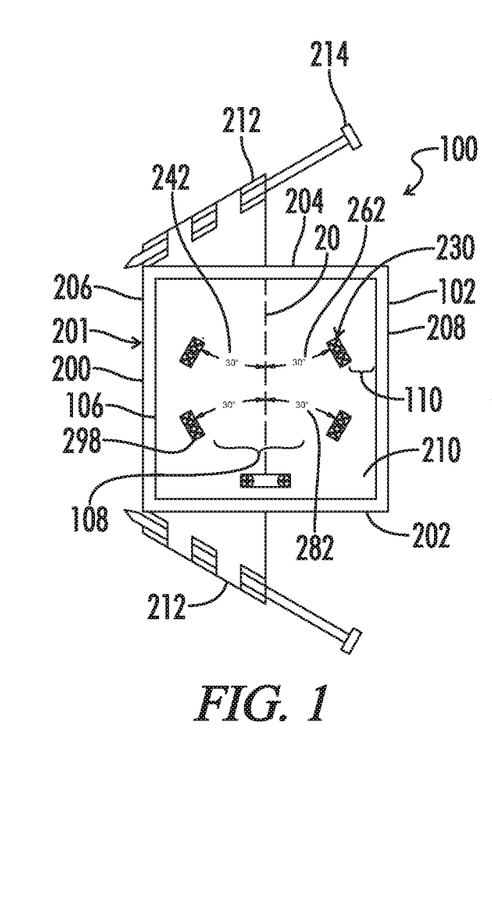
FIG. 1 is a front view of a rectangular pigtail electrical box before wiring.
Figure 2:
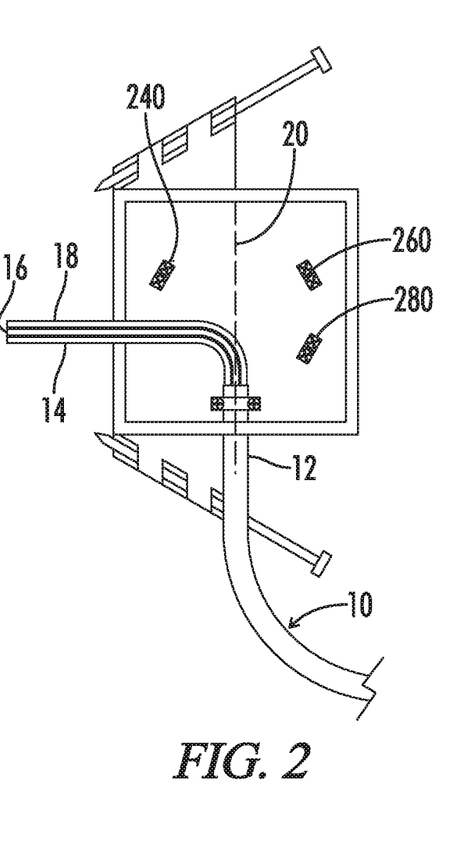
FIG. 2 is a front view of a rectangular pigtail electrical box with an electric cable installed through the bottom wall.
Figure 3:
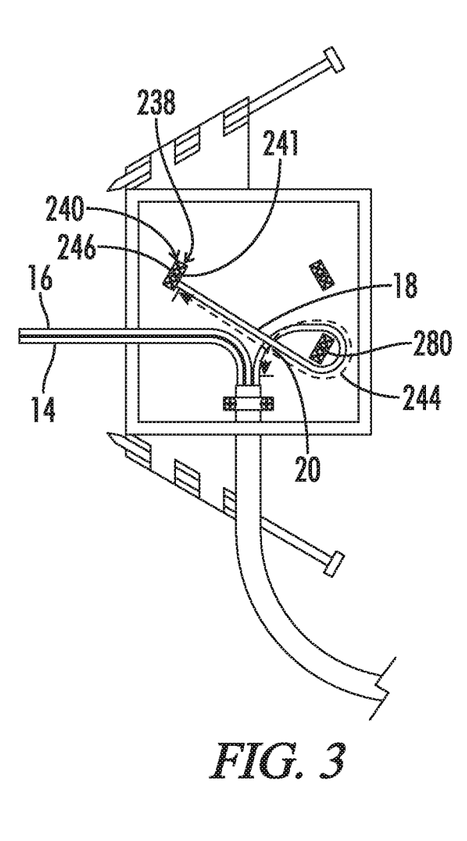
FIG. 3 is a front view of a rectangular pigtail electrical box with a first wire wrapped around a routing terminal and crossing the open center.
Figure 4:
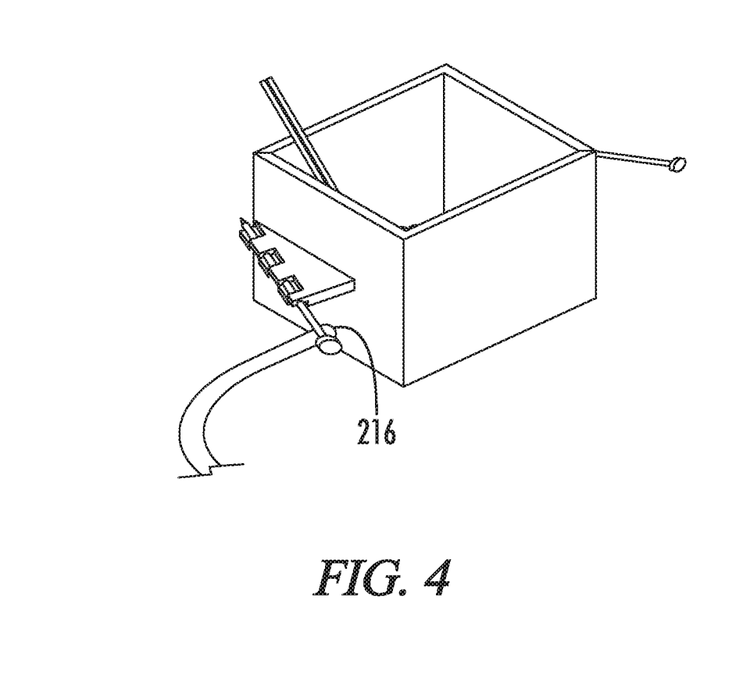
FIG. 4 is a perspective view of the box of FIG. 3.
Figure 5:
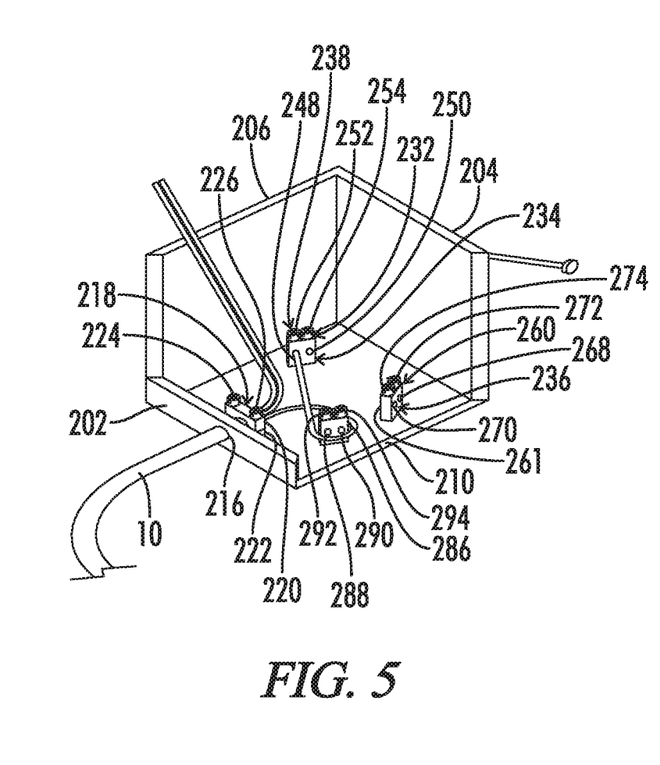
FIG. 5 is the perspective view of FIG. 4 with the bottom wall partially removed and the left side wall removed to show the wire routing across the open center

Both the rectangular box 102 and round box 104 include a pair of framing connection flanges 212 with each having a connection fastener 214. Note that the framing connection flanges 212 are only partially shown and appear to be behind the cable 10 in FIGS. 2, 3, and 6-14, but are actually located in proximity to the back wall 210 as shown in FIGS. 1, 4 and 5. As these types of flanges are well understood, this drawing modification was done for clarity of the cable 10 connection into the box 100.

Both the rectangular box 102 and round box 104 include a cable aperture 216 in the side wall 201 with a proximately positioned cable clamp 218. The cable clamp has a clamp top 220 secured to a clamp base 222 using a first Clamp screw 224 and a second clamp screw 226. Alternative embodiment could use other types of clamps as known in the art including plastic bent clamps, friction fit clamps, and the like.

The open center 108 is positioned between the routing guides 230 that are positioned around the perimeter of the open center 108. The routing guides 230 are positioned in proximity to the side wall 201 but separated from the side wall 201 by a guide gap 110 sufficient to position wires between the routing guides 230 and the side wall 201. The routing guides 230 include a guide body 232 with a termination face 234 where the wires can be inserted and a back side or curved side 236 that the wires can be wrapped around. The termination face 234 allows connection into the electrical wire coupler 238 built into the routing guide 230. Three routing guides 230 are shown as a first wire routing guide 240, second wire routing guide 260, third wire routing guide 280, and fourth wire routing guide 298 (see FIG. 14 for 298).

The first wire routing guide 240 is mounted with the first termination face 241 at a first termination angle 242 (see FIG. 1) of a negative thirty degrees measured as the angle necessary for rotation of the axis 20 of the clamped electric cable 10 to create a line parallel with the termination face 241. The preferred termination angle is a thirty-degree offset from the axis 20 as this minimizes the wire overlaps in the installed box 100. Note that both positive and negative termination angles may be utilized. Current electrical code specifies that the person wiring the box must have six (6) inches of free conductor wiring inside a box. By wrapping the wire 14, 16, 18 around any one routing guide 240, 260, 280, 298 and then terminating at another routing guide 240, 260, 280, 298, a termination distance 20 is maintained that meets the minimum wire length standard. For the first wire routing guide 240 this first termination distance 244 is shown in FIG. 3 by wrapping the third wire 18 around the third wire routing guide 280 before connecting to the electrical wire coupler 238 in the first wire routing guide 240 shown as the first wire clamp 246. The first wire clamp 246 electrically connects wire inserted into the first wire input aperture 248 and clamped by a first input clamp screw 252 to an electrical wire inserted into the first wire output aperture 250 and clamped by the first output clamp screw 254.

Figure 6:
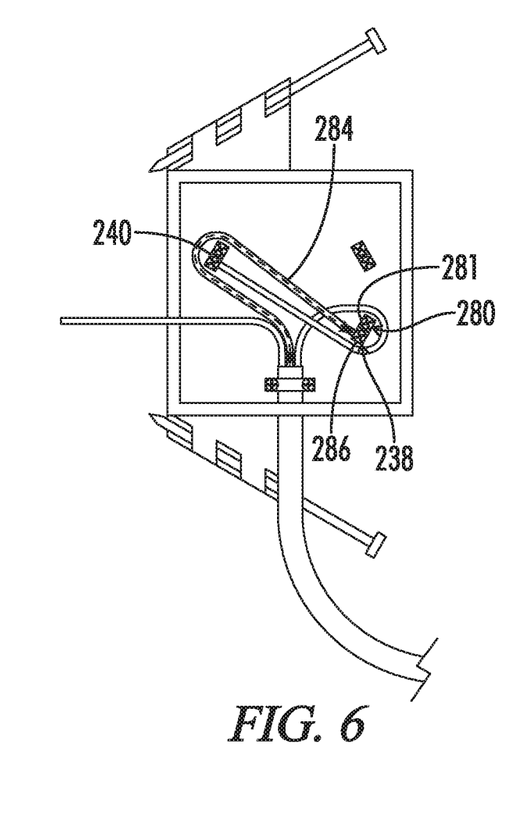
FIG. 6 is a front view of a rectangular pigtail electrical box with a second wire wrapped around a routing terminal and crossing the open center.

The third wire routing guide 280 is mounted with the third termination face 281 at a third termination angle 282 of a negative thirty degrees measured as the angle necessary for rotation of the axis 20 of the clamped electric cable 10 to create a line parallel with the termination face 281. The preferred termination angle is again a thirty-degree offset from the axis 20 as this minimizes the wire overlaps in the installed box 100. Here, the negative termination angle is utilized. For the third wire routing guide 280 the third termination distance 284 is shown in FIG. 6 by wrapping the third wire 16 around the first wire routing clamp 240 before connecting to the electrical wire coupler 238 in the third wire routing guide 280 shown as the third wire clamp 286. The third wire clamp 286 electrically connects the wire inserted into the third wire input aperture 288 and clamped by a third input clamp screw 292 to an electrical wire inserted into the third wire output aperture 290 and clamped by the third output clamp screw 294.

Figure 7:
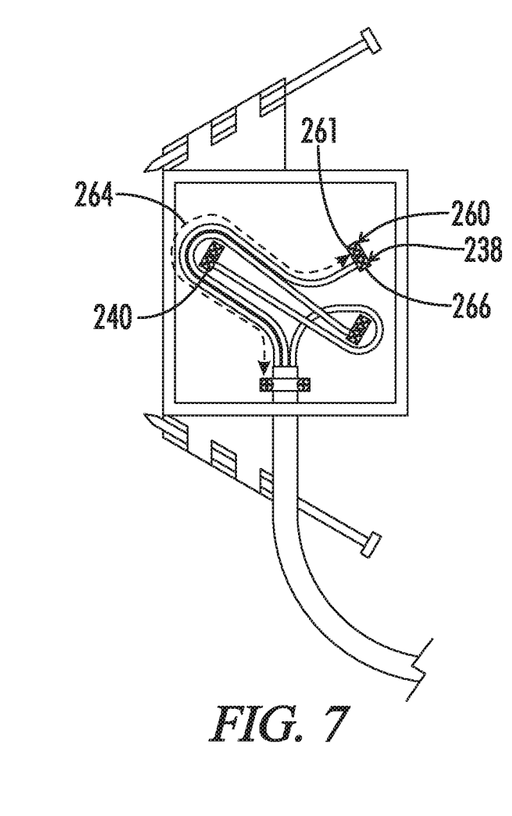
FIG. 7 is a front view of a rectangular pigtail electrical box with a third wire wrapped around a routing terminal and crossing the open center.
Figure 8:
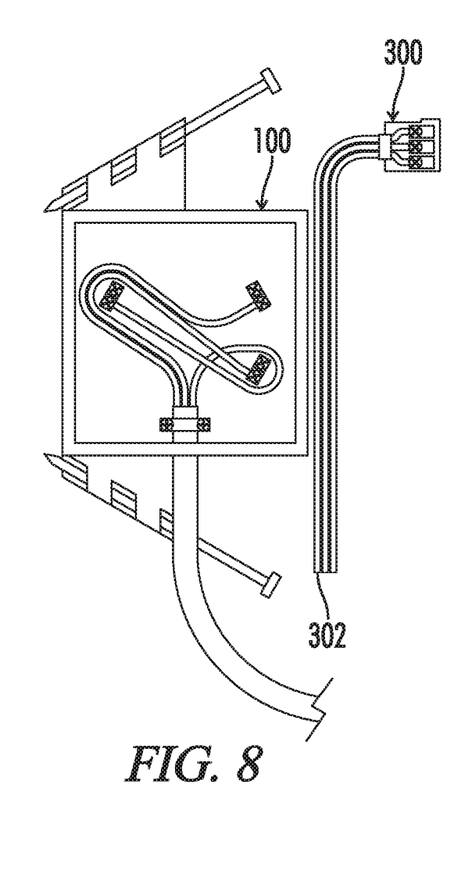
FIG. 8 is a front view of a rectangular pigtail electrical box with an adjacent positioned pigtail harness including a female pigtail coupler body.
Figure 9:
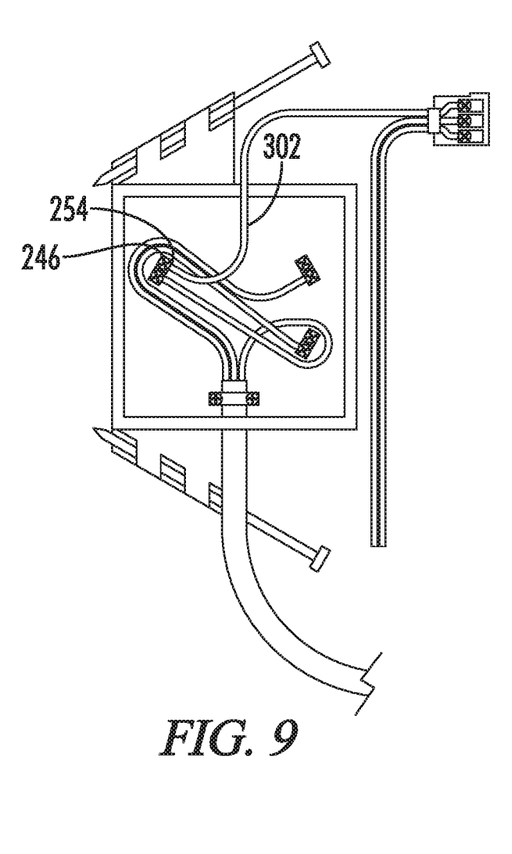
FIG. 9 is a front view of a rectangular pigtail electrical box with a first harness wire connected to the first wire clamp.
Figure 10:
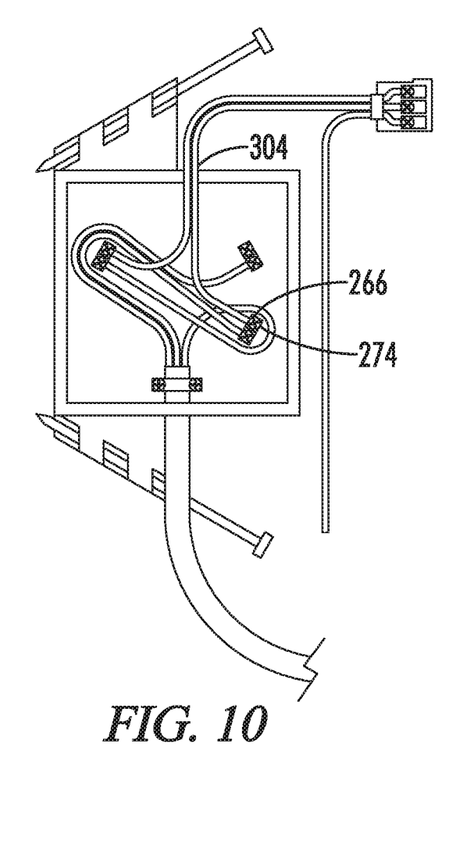
FIG. 10 is a front view of a rectangular pigtail electrical box with a second harness wire connected to the second wire clamp.
Figure 11:
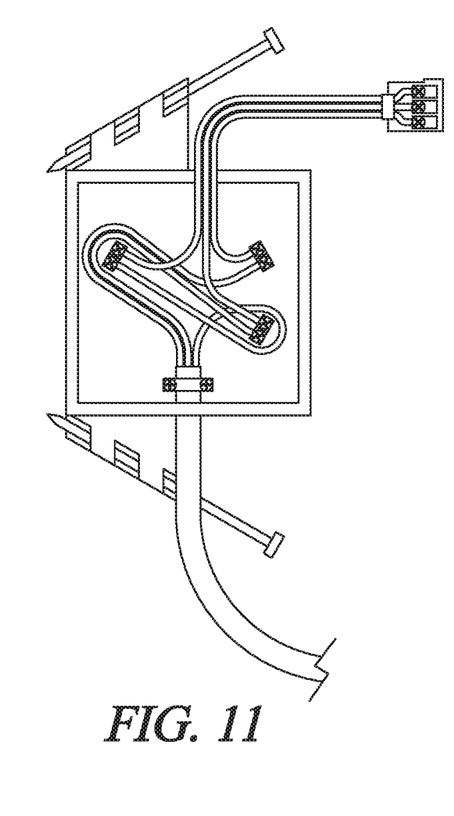
FIG. 11 is a front view of a rectangular pigtail electrical box with a third harness wire connected to the third wire clamp.

The second wire routing guide 260 is mounted with the second termination face 261 at a second termination angle 262 of a positive thirty degrees measured as the angle necessary for rotation of the axis 20 of the clamped electric cable 10 to create a line parallel with the termination face 261. The preferred termination angle is again a thirty-degree offset from the axis 20 as this minimizes the wire overlaps in the installed box 100. Here, the positive termination angle is utilized. For the second wire routing guide 260 the second termination distance 264 is shown in FIG. 7 by wrapping the second wire 16 around the first wire routing clamp 240 before connecting to the electrical wire coupler 238 in the second wire routing guide 260 shown as the second wire clamp 266. The second wire clamp 266 electrically connects the wire inserted into the second wire input aperture 268 and clamped by a second input clamp screw 272 to an electrical wire inserted into the second wire output aperture 270 and clamped by the second output clamp screw 274.

Note that a fourth wire routing guide 298 is shown in FIGS. 1 and 14 but has been removed from the remaining figures for clarity of the drawings.

FIGS. 8 through 14 show how the pigtail harness 300 may be wired into the pigtail electrical box 100. The first harness wire 302 is inserted into the first wire clamp 246 at the first wire output aperture 250 and clamped by the first output clamp screw 254. The second harness wire 304 is inserted into the second wire clamp 266 at the second wire output aperture 270 and clamped by the second output clamp screw 274. The third harness wire 306 is inserted into the third wire clamp 286 at the third wire output aperture 290 and clamped by the third output clamp screw 294. The first harness wire 302, second harness wire 304, and third harness wire 306 are all then connected into the female pigtail coupler body 308. The first harness wire 302 is electrically connected to the first female coupler termination 310, the second harness wire 304 is electrically connected to the second female coupler termination 312, and the third harness wire 306 is electrically connected to the third female coupler termination 314. Note that by having the female pigtail coupler body 308 anyone that opens the pigtail electrical box 100 will be protected from making electrical contact when replacing items like a plug or a switch. Also note that by using an oriented female coupler body 308 with an orientation control tab 309, the order of the wires in the connector has now been established by the knowledgeable electrician such that any replacements by later parties will not only not be exposed to the bare wires, but will have the proper wires located at the proper terminals such that future miswirings do not occur.

Figure 12:
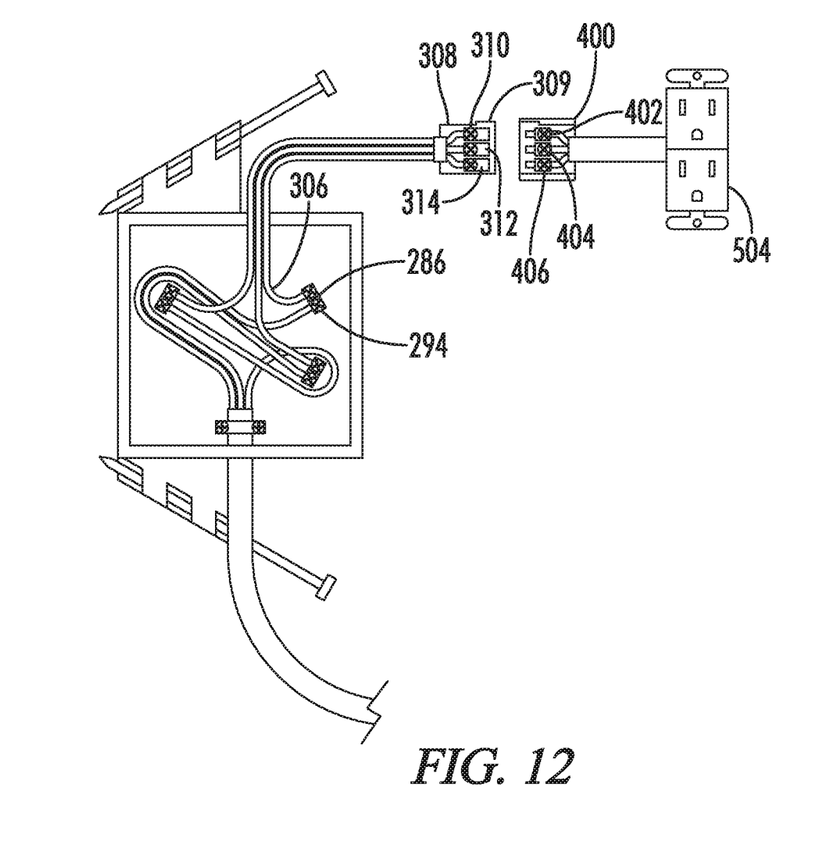
FIG. 12 is a front view of a rectangular pigtail electrical box with a male pigtail coupler body extending from an electrical plug.

Used with the female coupler body 308 is a male coupler body 400 as part of the male pigtail device 500. The male coupler body 400 includes a first male coupler termination 402, a second male coupler termination 404, a third male coupler termination 406, and an orientation control slot 409. The orientation control slot 409 works with the orientation control tab 309 for proper alignment of the female coupler body 308 and the male coupler body 400. The first male coupler termination 402 is electrically connected to the first male pigtail wire 501, the second male coupler termination 404 is electrically connected to the second male pigtail wire 502, and the third male coupler termination 406 is electrically connected to the third male pigtail wire 503. In this manner, an electrical connection can be made with the male pigtail device 500 such as by making a male pigtail plug 504 as shown in FIGS. 12 and 13, or a male pigtail switch 506 as shown in FIG. 14. Alternatively, the male coupler body 400 can simply be built into the plug or switch if desired.

Reference numerals used throughout the detailed description and the drawings correspond to the following elements:

electrical cable 10
   outer sheath 12
   first wire 14
   second wire 16
   third wire 18
   cable axis 20
Pigtail electrical box 100
   Rectangular box 102
   Round box 104
   Box interior 106
     Open center 108
     Guide gaps 110
Box body 200
   side wall 201
     Box bottom 202
     Box top 204
     Box left side 206
     Box right side 208
   back wall 210
   Framing connection flange 212
   Connection fastener 214
   cable aperture 216
   cable clamp 218
     Clamp top 220
     Clamp base 222

-continued

First Clamp screw 224
     Second clamp screw 226
   Routing guides 230
     Guide body 232
        Termination face 234
        Curved side 236
     Electrical wire coupler 238
     First wire routing guide 240
        First termination angle 242
        First termination distance 244
     First wire clamp 246
        First wire input aperture 248
        First wire output aperture 250
        First input clamp screw 252
        First output clamp screw 254
   Second wire routing guide 260
     Second termination face 261
     Second termination angle 262
     second termination distance 264
     Second wire clamp 266
        Second wire input aperture 268
        second wire output aperture 270
        Second input clamp screw 272
        Second output clamp screw 274
   Third wire routing guide 280
     Third termination face 281
     Third termination angle 282
     Third aperture termination distance 284
     Third wire clamp 286
        Third input clamp screw 288
        Third output clamp screw 290
   Fourth wire routing guide 298
Pigtail harness 300
   First harness wire 302
   Second harness wire 304
   Third harness wire 306
   Female pigtail coupler body 308
     orientation control 309
   First female coupler termination 310
   Second female coupler termination 312
   Third female coupler termination 314
Male coupler body 400
   First male coupler termination 402
   Second male coupler termination 404
   Third male coupler termination 406
Male pigtail device 500
   First male pigtail wire 501
   Second male pigtail wire 502
   Third male pigtail wire 503
   Male pigtail plug 504
   Male pigtail switch 506

From the foregoing, it will be seen that this invention well adapted to obtain all the ends and objects herein set forth, together with other advantages which are inherent to the structure. It will also be understood that certain features and sub combinations are of utility and may be employed without reference to other features and sub combinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A pigtail electrical junction box apparatus for an electrical cable having a first cable wire, comprising:
   a box body including a side wall and a back wall defining a box interior with an open center;
   the box body defining a cable aperture sized to allow the cable to pass into the box interior;
   a cable clamp positioned on the box body adjacent to the cable aperture and sized to clamp the electrical cable;
   a first wire routing guide mounted to the back wall, the first wire routing guide positioned in the box interior distally from the side wall to define a first edge gap, the first wire routing guide including a first wire clamp, the first wire clamp including a first termination face adjacent to the open center;
   the first cable wire routed through the open center to the first termination face and electrically connected to the first wire clamp;
   a pigtail harness including a first harness wire; and
   the first harness wire routed through the open center to the first termination face and electrically connected to the first wire clamp.

2. The apparatus of claim 1, the electrical cable having a second cable, the apparatus further comprising:
   a second wire routing guide mounted to the back wall, the second wire routing guide including a second wire clamp, the second wire clamp including a second termination face adjacent to the open center;
   the second cable wire routed through the open center to the second termination face and electrically connected to the second wire clamp;
   the pigtail harness including a second harness wire; and
   the second harness wire routed through the open center to the second termination face and electrically connected to the second wire clamp.

3. The apparatus of claim 1, the electrical cable having a third cable, the apparatus further comprising:
   a third wire routing guide mounted to the back wall, the third wire routing guide including a third wire clamp, the third wire clamp including a third termination face positioned facing the open center;
   the third cable wire routed through the open center to the third termination face and electrically connected to the third wire clamp;
   the pigtail harness including a third harness wire; and
   the third harness wire routed through the open center to the third termination face and electrically connected to the third wire clamp.

4. The apparatus of claim 1, the pigtail harness including a pigtail coupler body.

5. The apparatus of claim 1, further comprising:
   a second wire routing guide positioned in the box interior distally from the side wall to define a second edge gap;
   the first wire routed from the cable clamp around the second wire routing guide, through the second edge gap, and across the open center to the first wire clamp.

6. The apparatus of claim 1, the second wire routing guide further comprising:
   a curved side adjacent to the second edge gap.

7. The apparatus of claim 1, the electrical cable having a second cable, the apparatus further comprising:
   a second wire routing guide positioned in the box interior distally from the side wall to define a second edge gap, the second wire routing guide including a second termination face positioned facing the open center;
   the second wire routed from the cable clamp around the first wire routing guide, through the first edge gap, and across the open center to the second termination face.

8. The apparatus of claim 1, further comprising:
   a framing connection flange extending from the body wall; and
   a connection fastener positioned in the framing connection flange.

9. The apparatus of claim 1, further comprising:
   a male pigtail device including a male coupler body with a male coupler termination electrically connected to a male pigtail wire.

10. The apparatus of claim 1, further comprising:
    a male pigtail device including a male coupler body with a male coupler termination electrically connected to a male pigtail plug.

11. The apparatus of claim 1, further comprising:
    a male pigtail device including a male coupler body with a male coupler termination electrically connected to a male pigtail switch.

* * * * *